(12) United States Patent
Park et al.

(10) Patent No.: US 11,335,252 B2
(45) Date of Patent: May 17, 2022

(54) DISPLAY DEVICE AND DRIVING METHOD THEREOF

(71) Applicant: LG Display Co., Ltd., Seoul (KR)

(72) Inventors: ManGyu Park, Paju-si (KR); JinCheol Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/392,876

(22) Filed: Aug. 3, 2021

(65) Prior Publication Data

US 2022/0059017 A1     Feb. 24, 2022

(30) Foreign Application Priority Data

Aug. 19, 2020  (KR) .................. 10-2020-0104122

(51) Int. Cl.
*G09G 3/32* (2016.01)
*H04L 7/033* (2006.01)
*H04L 7/04* (2006.01)

(52) U.S. Cl.
CPC ............. *G09G 3/32* (2013.01); *H04L 7/0331* (2013.01); *H04L 7/048* (2013.01); *G09G 2310/027* (2013.01); *G09G 2310/061* (2013.01)

(58) Field of Classification Search
CPC ............... G09G 3/32; G09G 2310/027; G09G 2310/061; H04L 7/0331; H04L 7/048
See application file for complete search history.

(56) References Cited

U.S. PATENT DOCUMENTS

| | | | |
|---|---|---|---|
| 2015/0103038 A1* | 4/2015 | Han | G06F 3/04166 345/174 |
| 2016/0189621 A1* | 6/2016 | Kim | G09G 3/3258 345/215 |
| 2017/0193892 A1* | 7/2017 | Ha | G09G 3/2022 |
| 2018/0122294 A1* | 5/2018 | Do | G09G 5/008 |
| 2018/0190218 A1* | 7/2018 | Jang | G09G 3/3611 |
| 2019/0197979 A1* | 6/2019 | Kim | G09G 3/3275 |

\* cited by examiner

*Primary Examiner* — Andrew Sasinowski
(74) *Attorney, Agent, or Firm* — Fenwick & West LLP

(57) ABSTRACT

A display is disclosed where in an optimization mode, the controller transmits a first lock signal having a pulse waveforms to a first source driver circuit among source driver circuits, receives a second lock signal having pulse waveforms from a last source driver circuit that receives the first lock signal, and transmits phase loop fixed data for recovering a frequency and a phase of a clock to each of the source driver circuits when the second lock signal is received, and in the display mode, the controller transmits a first lock signal having a preset voltage level to the first source driver circuit, receives a second lock signal having a plurality of preset voltage levels from a last source driver circuit, and supplies an image signal and control data to each of the source driver circuits when the second lock signal is received.

20 Claims, 16 Drawing Sheets

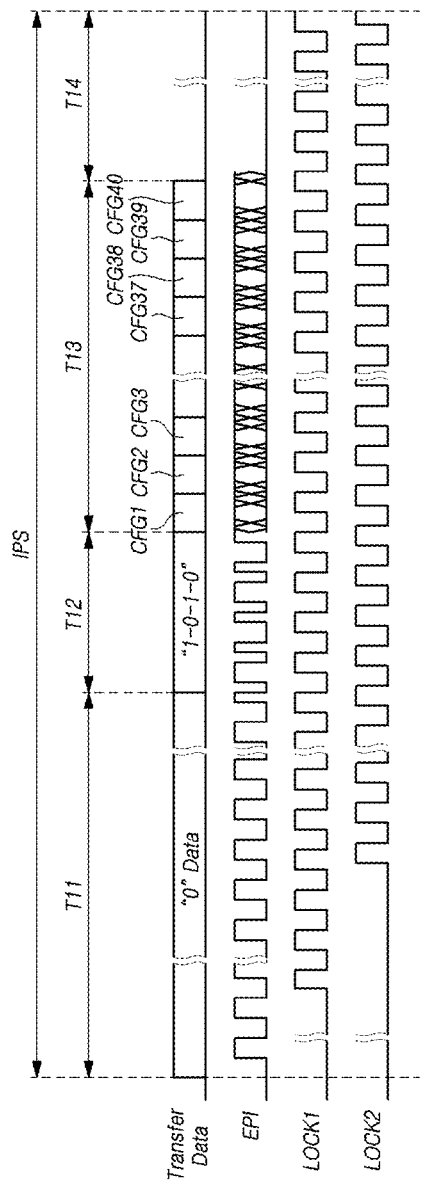

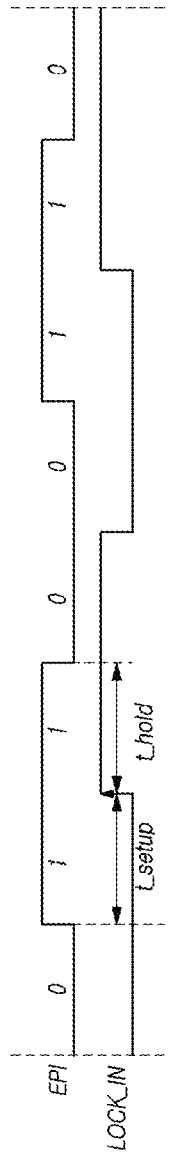
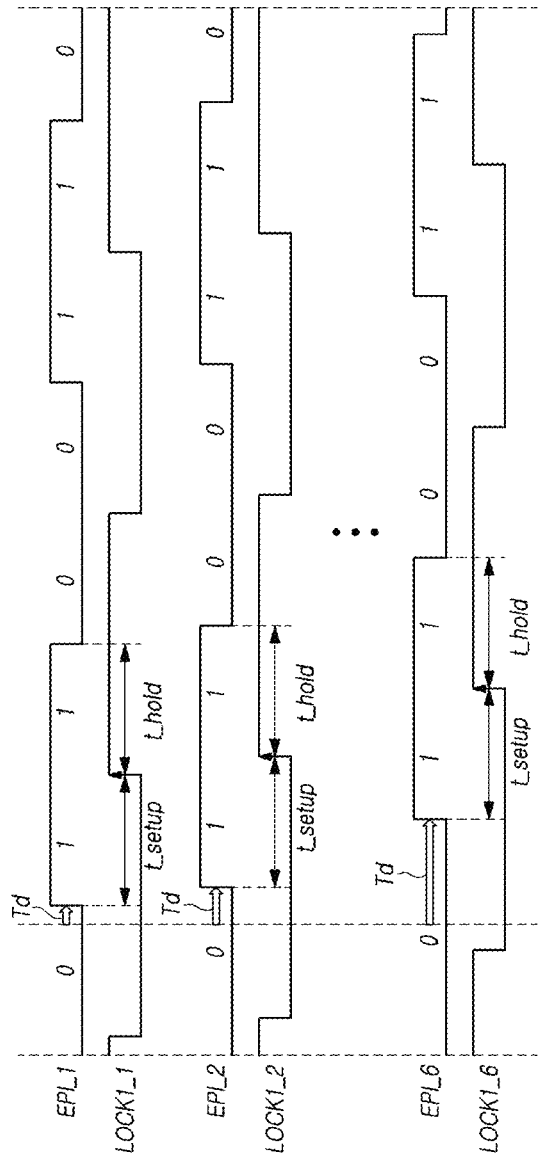

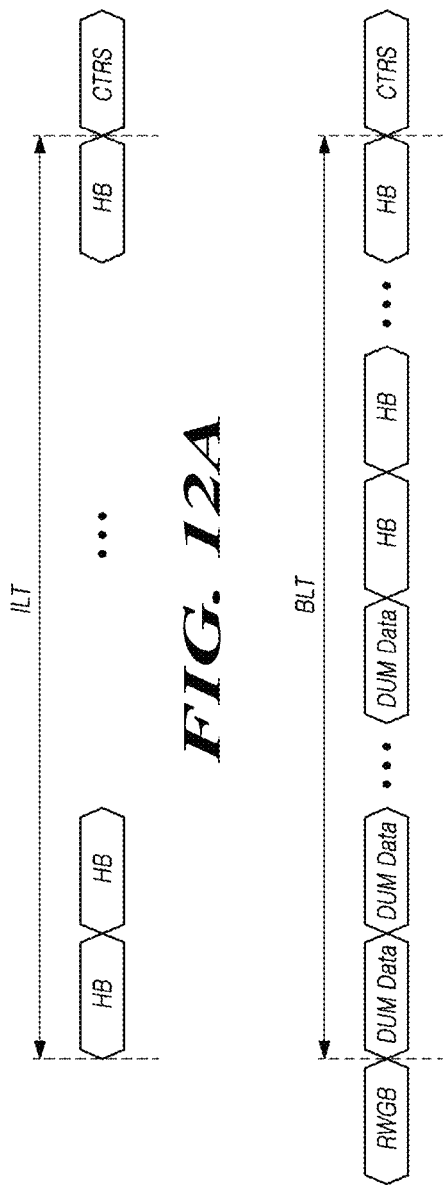

DISPLAY DEVICE AND DRIVING METHOD THEREOF

CROSS-REFERENCES TO RELATED APPLICATIONS

This application claims the benefit and priority from Republic of Korea Patent Application No. 10-2020-0104122, filed in the Republic of Korea on Aug. 19, 2020, which is hereby incorporated by in its entirety.

BACKGROUND

Technical Field

The present disclosure relates to a display device and driving method thereof.

Description of the Related Art

As the information society develops, demands for display devices for displaying images are increasing in various forms. As a display device, various types of display devices such as a liquid crystal display device (LCD) and an electroluminescence display device (ELD) are used.

The electroluminescence display device (ELD) may include a quantum-dot light emitting display device including a quantum-dot, an inorganic light emitting display device, and an organic light emitting display device.

The above display device may include a source driver circuit for supplying a data voltage to a data line to display an image.

There may be a plurality of source driver circuits corresponding to the resolution and size of the display device. The source driver circuits may have characteristic differences from each, and a signal output from the source driver circuit is distorted according to a position where the source driver circuit is disposed to the display device, and thus a problem in that the display device may not operate stably may occur. Also, this distortion can become greater if the signal has a high frequency.

SUMMARY

Embodiments of the present disclosure relates to a display device capable of transmitting signals at high speed and operating stably, and a driving method thereof.

In addition, embodiments of the present disclosure relates to a display device capable of reducing a frequency and a phase deviation between clocks that control the operation timing of each of a plurality of source driver circuits, and a driving method thereof.

In addition, embodiments of the present disclosure relate to a display device capable of improving image quality and a driving method thereof.

One aspect, there is provided a display device including: a controller that operates in a first optimization mode and operates in a display mode after the first optimization mode; and a plurality of source driver circuits connected to the controller and controlled by the controller.

In the first optimization mode, the controller may transmit a first lock signal having a plurality of pulse waveforms to a first source driver circuit among the plurality of source driver circuits, receive a second lock signal having a plurality of pulse waveforms from a last source driver circuit receiving the first lock signal which is transmitted from the first source driver circuit to the last source driver circuit in a cascade manner, and transmit a plurality of phase loop fixed data for recovering a frequency and a phase of a clock used in operation of each of the source driver circuits to each of the source driver circuits when the second lock signal is received.

In the display mode, the controller may transmit a first lock signal having a preset voltage level to the first source driver circuit, receive a second lock signal having a plurality of the preset voltage level from a last source driver circuit receiving the first lock signal which is transmitted from the first source driver circuit to the last source driver circuit in a cascade manner, and supply an image signal and control data to each of the source driver circuits when the second lock signal is received.

Another aspect, there is provided a driving method of a display device including: supplying a first lock signal of a plurality of pulse waveforms having a preset pattern and a plurality of phase loop fixed data from a controller to a plurality of source driver circuits; and setting, in each of the plurality of source driver circuits, a frequency and a phase of a clock recovered by the phase loop fixed data; and recovering the clock in response to the phase loop fixed data and transmitting an image signal to each of source driver circuits when the first lock signal having a preset first voltage is supplied to a plurality of source driver circuits.

According to the embodiments of the present disclosure, it is possible to provide a display device capable of transmitting signals at high speed and operating stably and a driving method thereof.

In addition, according to the embodiments of the present disclosure, it is possible to provide a display device capable of reducing a frequency and a phase deviation between clocks that control the operation timing of each of a plurality of source driver circuits by transmitting phase loop fixed data that can be used to set a frequency and a phase to each source driver circuit, and a driving method thereof.

In addition, according to the embodiments of the present disclosure it is possible to provide a display device capable of improving image quality, by suppressing transmission errors when an image signal is transmitted, and a driving method thereof.

BRIEF DESCRIPTION OF THE DRAWINGS

The above and other aspects, features and advantages of the present disclosure will be more apparent from the following detailed description taken in conjunction with the accompanying drawings, in which:

FIG. 7 is a timing diagram illustrating that the controller and the source driver circuit shown in FIG. 6 operate in a first optimization mode according to one embodiment.

FIGS. 9A and 8B are timing diagrams illustrating a process of converting phase loop fixed data in the first optimization mode shown in FIG. 7 according to another embodiment.

FIGS. 10A and 10B and 11A and 11B are timing diagrams illustrating a process in which a first lock signal and phase loop fixed data are transmitted to a plurality of source driver circuits in a display device according to an embodiment.

FIGS. 12A and 12B are timing diagrams showing an embodiment of the blank period shown in FIG. 4.

DETAILED DESCRIPTION

Figure 1:
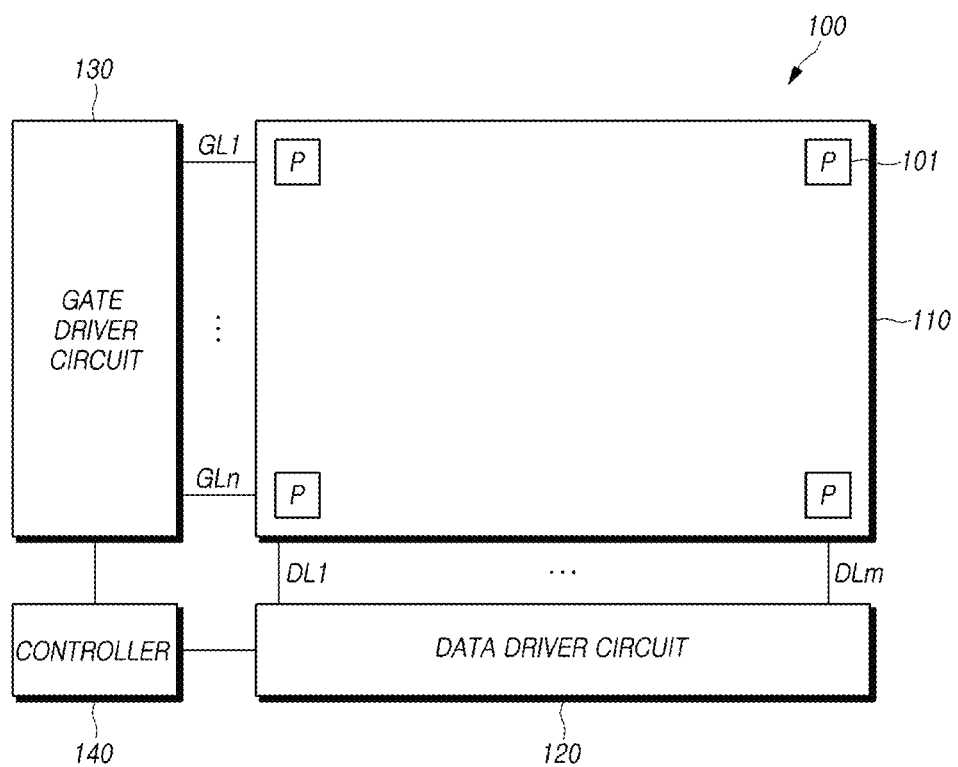
FIG. 1 is a plan view illustrating a display device according to one embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a plan view illustrating a display device 100 according to embodiments of the present disclosure.

Referring to FIG. 1, the display device 100 may include a display panel 110, a data driver circuit 120, a gate driver circuit 130, and a controller 140.

The display panel 110 may include a plurality of pixels 101. The plurality of pixels 101 may be arranged in a matrix form within the display panel 110, but the present invention is not limited thereto. Each of the plurality of pixels 101 may emit light of various colors such as red, green, or blue. However, the color of light emitted from each pixel is not limited thereto.

A plurality of gate lines GL1 to GLn and a plurality of data lines DL1 to DLm may be disposed on the display panel 110. The plurality of pixels 101 may be connected to the gate lines GL1 to GLn and the data lines DL1 to DLm. Each pixel 101 may receive a data signal transmitted through the corresponding data line among the data lines DL1 to DLm in response to a gate signal transmitted through the corresponding gate line among the gate lines GL1 to GLn. In addition, a plurality of light emission control lines EML1 to EMLn may be disposed on the display panel 110. The light emission control lines EML1 to EMLn transmit light emission control signals to the plurality of pixels 101, so that the time for the plurality of pixels 101 to emit light may be controlled.

The data driver circuit 120 may be electrically connected to the plurality of data lines DL1 to DLm to transmit the data signal to the pixel 101 through the data lines DL1 to DLm. Here, although one data driver circuit 120 is shown, it is not limited thereto. In addition, the data driver circuit 120 may include a plurality of source driver circuits. The number of the source driver circuits may be determined depending on the resolution and a size of the display panel 110.

The gate driver circuit 130 may be electrically connected to the plurality of gate lines GL1 to GLn and may supply gate signals to the plurality of pixels 101 through the plurality of gate lines GL1 to GLn. Here, the gate driver circuit 130 is shown to be disposed on one side of the display panel 110, but is not limited thereto, and may be disposed on both sides of the display panel 110. One gate driver circuit may be connected to an odd-numbered gate line and the other gate driver circuit may be connected to an even-numbered gate line. In addition, the display device 100 may not include a separate gate driver circuit, but may include a gate driver circuit 130 disposed in the display panel 110 in a gate generating circuit type (referred to as the GIP (Gate In Panel) type).

The controller 140 may control the data driver circuit 120 and the gate driver circuit 130. The controller 140 may supply the image signal RGB and the data control signal DCS to the data driver circuit 120 and may supply the gate control signal GCS to the gate driver circuit 130.

Figure 2:
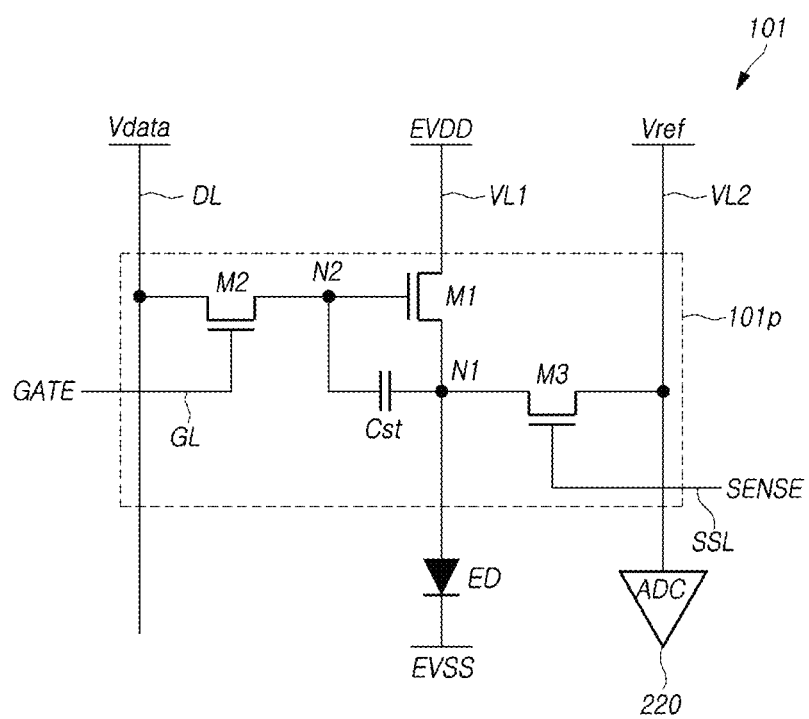
FIG. 2 is a circuit diagram illustrating a pixel according to one embodiment.

FIG. 2 is a circuit diagram illustrating a pixel according to one embodiment.

Referring to FIG. 2, the pixel 101 may include a light emitting device ED that emits light by receiving a driving current Id, and a pixel circuit 101p supplying the driving current Id to the light emitting device ED. The pixel circuit 101p may include a first transistor M1, a second transistor M2, and a capacitor Cst. The pixel circuit 101p may further include a third transistor M3. The first transistor M1 may supply a driving current to the light emitting device ED in response to a data signal Vdata. The second transistor M2 may supply the data signal Vdata from the data line DL to the first transistor M1 in response to a first gate signal GATE1. The capacitor Cst may hold the data signal Vdata supplied to the first transistor M1.

In the first transistor M1, a first electrode is connected to a first node N1 connected to a first power supply line VL1 to which a first voltage EVDD is supplied, a gate electrode is connected to a second node N2, and a second electrode is connected to a third node N3. The first transistor M1 can allow a current to flow from the first node N1 to the third node N3 depending on a voltage level of a data signal which is supplied to the second node N2. The first electrode of the first transistor M1 may be a drain electrode and the second electrode may be a source electrode. However, the disclosure is not limited thereto. The current flowing from the first node N1 to the third node N3 corresponds to Equation 1.

$$Id = k(V_{GS} - Vth)^2 \qquad \text{Equation 1}$$

Here, Id represents a value of the current flowing from the first node N1 to the third node N3, k represents electron mobility of a transistor, $V_{GS}$ represents a voltage difference between the gate electrode and the source electrode of the first transistor M1, and Vth represents a threshold voltage of the first transistor M1.

The second transistor M2 may include a first electrode connected to the data line DL, a second electrode connected to the second node N2, and a gate electrode connected to the first gate line GL1. The second transistor M2 may supply the data signal Vdata flowing through the data line DL to the third node N3 in response to the first gate signal GATE1 transmitted to the first gate line GL1.

The capacitor Cst may include a first electrode connected to the first node N1 and a second electrode connected to the second node N2. The capacitor Cst may maintain a voltage between the first node N1 and the second node N2. Therefore, the capacitor Cst may maintain a voltage level of the data signal Vdata transmitted to the second node N2.

In the light emitting device ED, the anode electrode may be electrically connected to the first node N1 and the cathode electrode may be electrically connected to the second power voltage EVSS. The light emitting device ED may include a light emitting layer which emits light by the current flowing from the anode electrode to the cathode electrode. The light emitting layer may include an inorganic layer or an organic layer. In addition, the light emitting layer may include a plurality of layers. The light emitting diode ED may emit red, green, and blue light. However, the present disclosure is not limited thereto, and the light emitting diode ED may emit white light.

The third transistor M3 may include a first electrode connected to the second power line EL2 supplying a reference voltage Vref, a second electrode connected to the first node N1. The gate electrode is connected to a sensing signal line SSL supplying a sensing signal SENSE. The second power line may be connected to an analog digital converter 220.

In addition, the third transistor M3 may supply the voltage level of the first node N1 to the analog-digital converter 220 in response to the sensing signal SENSE. The analog digital converter 220 may convert the voltage level of the first node N1 into a digital signal. The analog digital converter 220 may be included in the data driver circuit 120 shown in FIG. 1.

Figure 3:
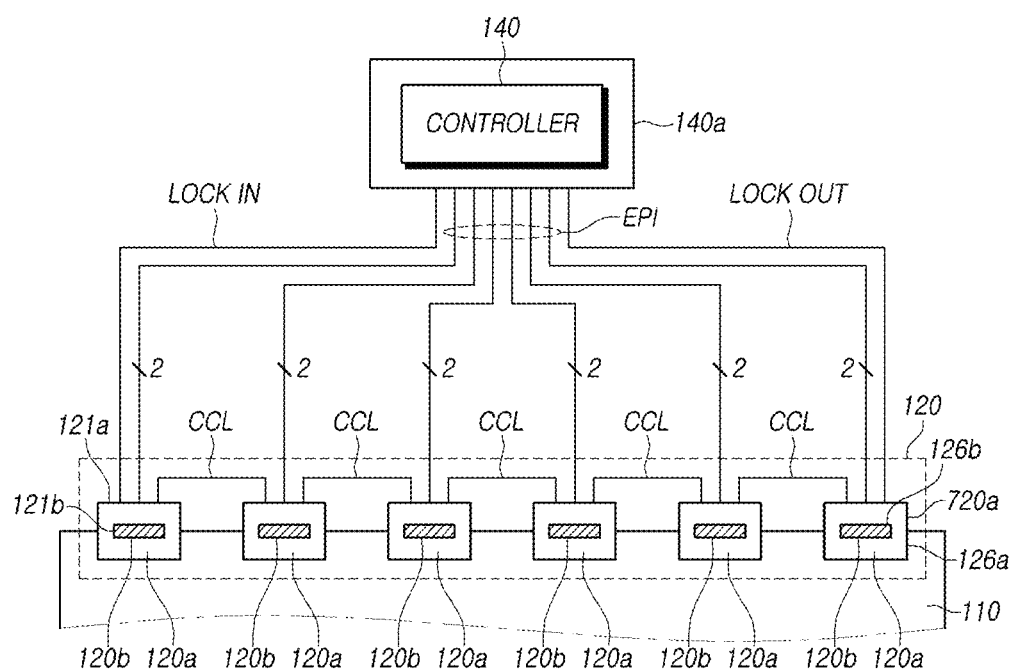
FIG. 3 is a plan view illustrating a connection between a controller and a plurality of source driver circuits in a display device according to one embodiment.

FIG. 3 is a plan view illustrating a connection between a controller and a plurality of source driver circuits in a display device according to one embodiment.

Referring to FIG. 3, a plurality of films 120a are disposed on one side of the display panel 110. The display panel 110 and the plurality of films 120a may be connected to each other. Each film 120a may be a flexible circuit film.

In addition, each of source driver circuits 120b may be disposed on each of the plurality of films 120a. The source driver circuit 120b may be implemented as an integrated circuit. The source driver circuits 120b disposed on each film 120a may correspond to the data driver circuit 120 illustrated in FIG. 1. The source driver circuits 120b supplies a signal and/or a voltage to the display panel 110.

In addition, the control printed circuit board 140a may be connected to each film 120a. The controller 140 may be disposed on the control printed circuit board 140a. The controller 140 may be connected to the plurality of films 120a through the control printed circuit board 140a.

Lock signal lines transmitting a lock signal and a plurality of data transmission lines EPI may be disposed between the control printed circuit board 140a and the films 120a. The lock signal lines may include a lock-in line LOCK IN, a cascade line CCL, and a lock-out line LOCK OUT.

The lock-in line LOCK IN may connect the controller 140 and the source driver circuit 121b disposed on the first film 121a at the leftmost position among the films 120a. In addition, the lock-out line LOCK OUT may connect the controller 140 and the source driver circuit 121b disposed on the sixth film 126a disposed at the rightmost position among the films 120a. In addition, the first lock signal is transmitted from the control printed circuit board 140a to the first film 121a through the lock-in line LOCK IN, and the second lock signal is transmitted from the control printed circuit board 140a to the sixth film 126a through the lock-out line LOCK OUT. The first lock signal may be a signal input to the source driver circuit 120b, and the second lock signal may be a signal output from the source driver circuit 120b in response to the first lock signal.

In addition, the plurality of source driver circuits 120b disposed on each of the films 120a may be connected in a cascade manner to neighboring source driver circuits 120b through cascade lines CCL. That is, a signal output from one source driver circuit is transmitted to a neighboring source driver circuit, and a signal received from the neighboring source driver circuit may be transmitted to another neighboring source driver circuit, so that the plurality of source driver circuits 120b can receive signals sequentially.

Since the first lock signal is transmitted in a cascade manner between the plurality of source driver circuits 120b, the first lock signal output from the controller 140 is transferred to the one source driver circuit 121b through the lock-in line LOCK IN and then sequentially from the first source driver circuit 121b to the sixth source driver circuit 126b through the cascade line CCL. The second lock signal may be transmitted to the controller 140 from the sixth source driver circuit 126b, which is the last source driver circuit that received the first lock signal last, through the lock-out line LOCK OUT.

In addition, the plurality of data transmission lines EPI may connect the controller 140 and the plurality of source driver circuits 120b. That is, the controller 140 may be connected to each of the source driver circuits 120a in parallel through the data transmission line EPI.

Each of the lock-in line LOCK IN and the lock-out line LOCK OUT may include one line. The cascade line CCL may include one line connecting each of the source driver circuits 120b. In the plurality of data transmission lines EPI, a pair of lines may be connected to one film 120a. A signal transmitted through the plurality of data transmission lines EPI may be a differential signal.

Figure 4:
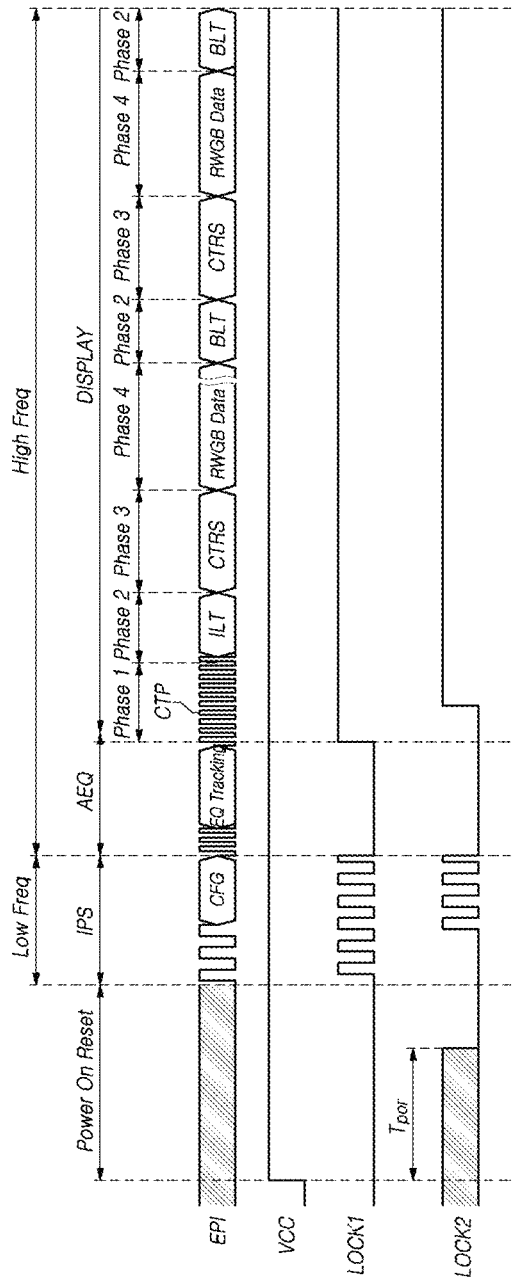
FIG. 4 is a timing diagram illustrating an operation between the controller and the source driver circuit shown in FIG. 3 according to one embodiment.
Figure 5A:
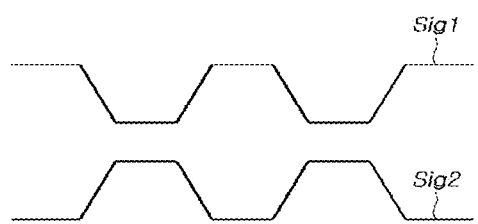
FIGS. 5A and 5B are conceptual diagrams for explaining an eye characteristic of a differential signal according to one embodiment.
Figure 5B:
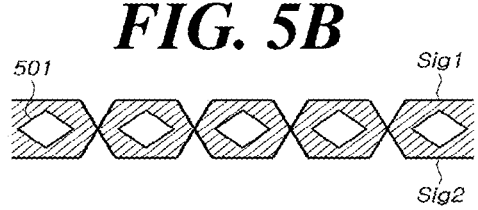

FIG. 4 is a timing diagram illustrating an operation between the controller and the source driver circuit shown in FIG. 3 according to one embodiment. FIGS. 5A and 5B are conceptual diagrams for explaining an eye characteristic of a differential signal according to one embodiment.

Referring to FIG. 4, the controller 140 and the source driver circuit 120b can be operated by dividing operating mode into a power on reset mode POWER ON RESET, a first optimization mode Initial PLL setting (hereinafter IPS), and a display mode DISPLAY. The controller 140 and the source driver circuit 120b may be designed to operate in the order of a first optimization mode IPS and the display mode DISPLAY after the power on reset mode POWER ON RESET is performed. In addition, the controller 140 may be operated in a second optimization mode Auto EQ mode (hereinafter AEQ), and the second optimization mode AEQ may be performed between the first optimization mode IPS and the display mode DISPLAY. However, the order of the above modes of the controller 140 is not limited thereto.

The power on reset mode POWER ON RESET is a period in which power supplied to the display device 100 including the controller 140 and the plurality of source driver circuits 120b is initialized. The power on reset mode POWER ON RESET may be performed when the power is supplied to the display device 100, and when the power on reset mode POWER ON RESET is performed, the power is supplied to the controller 140 and the source driver circuit 120b. When the power on reset mode POWER ON RESET is maintained for a preset time or longer, the controller 140 and the source driver circuit 120b may start to operate.

The first optimization mode IPS is a period in which the frequency and/or the phase of clocks used for internal operation of the plurality of source driver circuits 120b are set.

In the first optimization mode IPS, the controller 140 supplies a plurality of phase loop fixed data CFGs to the plurality of source driver circuits 120b, and the plurality of source driver circuits 120b may be set the frequency and the phase of the clock using one of the plurality of phase loop fixed data CFG.

The second optimization mode AEQ is a period in which the voltage level of the data output from the controller 140 is tuned in order to reduce the transmission error rate of the data transmitted from the controller 140 to the plurality of source driver circuits 120b. In the second optimization mode AEQ, the controller 140 transmits a plurality of error detection data to the plurality of source driver circuits 120b, respectively, and then measures each transmission error rate corresponding to each of the error detection data.

In addition, each of the plurality of source driver circuits 120b may transmit the transmission error rate to the controller 140. Therefore, the controller 140 tracks the voltage level with a low transmission error rate (EQ tracking). In addition, the controller 140 may output an image signal RWGB by selecting the voltage level having the low transmission error rate according to the received transmission error rate.

The display mode DISPLAY is a period in which the image signal RWGB and control data CTRS are supplied to the plurality of source driver circuits 120b so that an image is displayed on the display panel 110 shown in FIG. 1. Since the controller 140 operates by receiving the clock, but the plurality of source driver circuits 120b do not receive the clock, the plurality of source driver circuits 120b recover and use the clock to perform a normal operation. Further, in the display mode DISPLAY, the plurality of source driver circuits 120b recover the clock by using the phase loop fixed data CFG supplied in the first optimization mode IPS, and the image signal RWGB may be processed to generate a data signal and supplied to the display panel 110.

In addition, in the display mode DISPLAY, the image signal may be supplied to correspond to the voltage level set to the voltage level having the low transmission error rate in the second optimization mode AEQ.

In the power on reset mode POWER ON RESET, the first driving power supply VCC is started. The first driving power VCC is supplied to the controller 140 and/or the source driver circuit 120b. In the power on reset mode POWER ON RESET, the first lock signal LOCK1 may be in a low state. In addition, the first lock signal LOCK1 starts to be transmitted to the plurality of source driver circuits 120b and the output state of the second lock signal LOCK2 can be undefined during a period Tpor that is not yet transmitted to the last source driver circuit 126b.

When the first lock signal LOCK1 is transmitted to the sixth source driver circuit 126b, the second lock signal LOCK2 output from the sixth source driver circuit 126b may be transferred to the controller 140 in a low state. In addition, the data transmitted to the source driver circuit 120b through the data transmission line EPI in the power on reset mode POWER ON RESET may be 0.

In the first optimization mode IPS, the first lock signal LOCK1 may be supplied as a plurality of pulse waveforms having a preset pattern. The first lock signal LOCK1 supplied in the first optimization mode ISP may serve as a clock in the first optimization mode ISP. Since the second lock signal LOCK2 is output from the source driver circuit 120b receiving the first lock signal LOCK1, after the first lock signal LOCK1 is input in the first optimization mode IPS and a preset time elapses, the second lock signal LOCK2 may be output as a pulse waveform having the same pattern as the first lock signal LOCK1.

In the first optimization mode IPS, the phase loop fixed data CFG may be transmitted to the data transmission line EPI. The phase loop locked data CFG may be supplied in parallel to the plurality of source driver circuits 120b through the data transmission line EPI after the first optimization mode IPS starts and then the preset time elapses.

The controller 140 may be operated according to the clock, and the control data CTRS and the image signal RGB are synchronized with the clock, and may be supplied to the plurality of source driver circuits 120b from the controller 140. The plurality of source driver circuits 120b may process the control data CTRS and the image signal RGB to display an image on the display panel 110 illustrated in FIG. 1.

In order for the source driver circuit 120b to normally display an image, it may operate in synchronization with the clock at which the controller 140 operates. However, since the line for the clock to which the clock is transmitted is not arranged between the controller 140 and the plurality of source driver circuits 120b, the plurality of source driver circuits 120*b* recover the clock and then use the recovered clock. By processing the control data CTRS and the image signal RGB, an image may be displayed on the display panel 110.

The plurality of source driver circuits 120*b* use the phase loop-fixed data when recovering the clock. The source driver circuits 120*b* have different environments and hardware differences therebetween. In addition, when the plurality of source driver circuits 120*b* recover the clock by using the set phase loop fixed data, the phase and the frequency of the clocks output from the source driver circuits 120*b* may be different from each other due to the different environments and the hardware differences therebetween. For example, the different environments between the source driver circuits 120*b* may occur due to a difference in positions in which the plurality of source driver circuits 120*b* are disposed in the display device 100.

However, when the phase loop fixing data CFG is transmitted to each of the source driver circuits 120*b*, each of the source driver circuits 120*b* can set the phase and the frequency of the clock according to the phase loop fixed data CFG and output the clock. Since the phase loop fixed data CFG can be transmitted to each of the source driver circuits 120*b*, each source driver circuit 120*b* receives and uses the required phase loop fixed data CFG without using the set phase loop fixed data.

In addition, if the clocks output from each of the source driver circuits 120*b* have a phase and frequency deviation due to the received phase loop fixed data CFG, the phase and the frequency of the clock output from the source driver circuits 120*b* can be changed by transmitting another phase loop fixing data CFG to the source driver circuit 120*b*.

For the same reason as described above, the phase and frequency deviation of the clock output from each source driver circuit 120*b* may be suppressed.

As described above, since there is not have a clock line connecting the controller 140 and the plurality of source driver circuits 120*b*, a clock for use when the phase loop fixed data CFG is transmitted from the controller 140 to the plurality of source driver circuits 120*b* in the first optimization mode IPS may be transmitted through a line other than the clock line. In order for the source driver circuit 120*b* to use the clock in the first optimization mode IPS, the first lock signal LOCK1 may be used as a clock.

There can be supplied the first lock signal LOCK1 having a plurality of pulse waveforms as through the lock-in line LOCK IN connecting the controller 140 to the source driver circuit 121*b* disposed at the leftmost of the plurality of source driver circuits 120*b*. Since the first lock signal LOCK1 can be sequentially transferred to all the source driver circuits 120*b* through the cascade line CCL, the plurality of source driver circuits 120*b* sequentially receive the first lock signal LOCK1. Accordingly, the lock-in line LOCK IN and the cascade line CCL may be lines for transmitting the clock in the first optimization mode IPS.

When the second lock signal LOCK2 corresponding to the first lock signal LOCK1 from the last source driver circuit 126*b*, which received the first lock signal LOCK1 is transmitted to the controller 140 through the lockout line LOCK OUT, the controller 140 may supply the phase loop fixed data CFG to each source driver circuit 120*b* in parallel.

The controller 140 may transmit the phase loop fixing data CFG to each source driver circuit 120*b*, and the each of the plurality of source driver circuits 120*b* may set the phase and the frequency of the clock used in the source driver circuit 120*b* according to the phase loop fixing data CFG. For this reason, in the manufacturing process of the source driver circuit 120*b*, each source driver circuit 120*b* does not set the phase and the frequency of the clock by the preset phase loop fixed data CFG, but the first optimization mode (IPS), the phase loop fixed data CFG is transmitted to each source driver circuit 120*b*, and the phase and the frequency of the clock output from the source driver circuit 120*b* may be set by the received phase loop fixed data.

If the image on the display panel 110 is normally displayed while the source driver circuit 120*b* operates using the clock in which the phase and the frequency are set by the received phase loop fixed data (CFG), the source driver circuit 120*b* may operate with the clock generated by the received phase loop fixed data CFG without changing the received phase loop fixed data CFG.

However, if the image on the display panel 110 is not normally displayed while the source driver circuit 120*b* operates in response to the clock having the phase and the frequency set by the received phase loop fixed data CFG, the first optimization mode IPS is performed again so that another phase loop fixed data CFG may be transmitted to the source driver circuit 120*b*. The phase and the frequency of the clock may be set in the source driver circuit 120*b* by the newly transmitted phase loop fixed data CFG.

In the second optimization mode AEQ, the voltage level of the data output from the controller 140 to the plurality of source driver circuits 120*b* through the data transmission line EPI may be tuned. The distances between the controller 140 and the plurality of source driver circuits may vary depending on the positions where the films 120*a* are attached to the display panel 110 as illustrated in FIG. 3. In particular, as the size of the display panel 110 increases, the differences between the controller 140 and the plurality of source driver circuits 120*b* may increase. If the length of the data transmission line EPI connecting the controller 140 and the plurality of source driver circuits 120*b* is different, the differences in impedance components such as resistance may occur between the data transmission lines EPI. Accordingly, the transmission error rate of the data transmitted from the controller 140 to each of the plurality of source driver circuits 120*b* may differ for each of the plurality of source driver circuits 120*b*. As the distance from the controller 140 to each of the plurality of source driver circuits 120*b*, the transmission error rate of the data transmitted from the controller 140 to each of the plurality of source driver circuits 120*b* may be increased.

The controller 140 may transmit a plurality of the error detection data BERT used to determine the transmission error rate of the data in the second optimization mode AEQ to each of the plurality of source driver circuits 120*b*. In addition, each of the plurality of source driver circuits 120*b* may detect the transmission error rate of the data corresponding to the plurality of transmitted error detection data BERT. In addition, each of the plurality of source driver circuits 120*b* may transmit the data transmission error rate to the controller 140.

The controller 140 may control the voltage level of data output through the data transmission line EPI from the controller 140 in response to the received transmission error rate. In addition, in the second optimization mode AEQ, the controller 140 may prevent an increase in the data transmission error rate by improving an EYE characteristic of the transmitted data.

The data transmission line EPI includes a pair of lines. As shown in (FIG. 5A, a first signal Sig1 is transmitted through one data transmission line among a pair of data transmission lines, and a second signal Sig2 having a phase opposite to that of the first signal Sig1 may be transmitted through the other data transmission line. Since the first signal Sig1 and the second signal Sig2 of opposite phases are supplied to the source driver circuit 120b, the amplitude of the signal recognized by the source driver circuit 120b is equal to that of the transmitted first signal Sig1. It may be twice the amplitude of the second signal Sig2. For this reason, when the differential signal is used, the transmission rate can be increased even when the same voltage as that of using one signal is used.

And, as shown in FIG. 5B, the larger or clearer the shape of a rhombus 501 in the hatched portion in the middle between the two signals Sig1 and Sig2, the lower the signal distortion of transmitted data may be. In addition, the smaller or less clear the rhombic shape 501 in the hatched portion, the greater the signal distortion of the transmitted data may be. Improving the EYE characteristic refers to adjusting the voltage level of the signal so that the rhombic shape 501 appears larger and clearer between the two signals Sig1 and Sig2 supplied as the differential signal.

In the display mode DISPLAY, the controller 140 may supply the image signal RGB and the control data CTRS to the plurality of source driver circuits 120b. The image corresponding to the image signal RGB may be displayed on the display panel 110 illustrated in FIG. 1 by the image signal RGB and the control data CTRS. Here, the image signal RGB may include image signals corresponding to red, white, green, and blue, but is not limited thereto. The control data CTRS may include a data control signal for controlling the data driver circuit 120 shown in FIG. 1 and a gate control signal for controlling the gate driver circuit 130. However, it is not limited thereto.

Since the line through which a clock is transmitted is not disposed between the controller 140 and the plurality of source driver circuits 120b, each of the plurality of source driver circuits 120b uses a signal transmitted from the controller 140 to generate the clock used for the operation of the plurality of source driver circuits 120b.

The display mode DISPLAY includes the first display period Phase 1 supplying the clock training pattern CTP to the plurality of source driver circuits 120b, the second display period Phase 2 including the blank period through which the signal and the image signal RGB are not transmitted, the third display period Phase 3 through which the control data CTRS is transmitted, and a fourth display period Phase 4 through which the image signal RGB are transmitted.

In the first display period Phase 1, each source driver circuit 120b may receive the clock training pattern CTP. Each source driver circuit 120b may recover the internal clock of the source driver circuit 120b to correspond to the clock used in the controller 140 in response to the clock training pattern CTP and the set phase loop fixed data CFG.

In addition, each frame of the image may be distinguished by the second display period (Phase 2). Also, since the control data CTRS is transmitted in the third display period Phase 3, a signal for controlling the source driver circuit 120b may be transmitted. In the fourth display period Phase 4, the source driver circuit 120b may receive the image signal RGB. The source driver circuit 120b may display the image on the display panel 110 by processing the image signal RGB in response to the control data CTRS and the clock.

In addition, the first optimization mode IPS may operate at a low frequency Low Freq, and the second optimization mode AEQ and display mode DISPLAY may operate at a higher frequency than that of the first optimization mode IPS. That is, the driving frequency of the display device 100 may increase after a certain period of time after the power on reset mode POWER ON RESET is performed.

Figure 6:
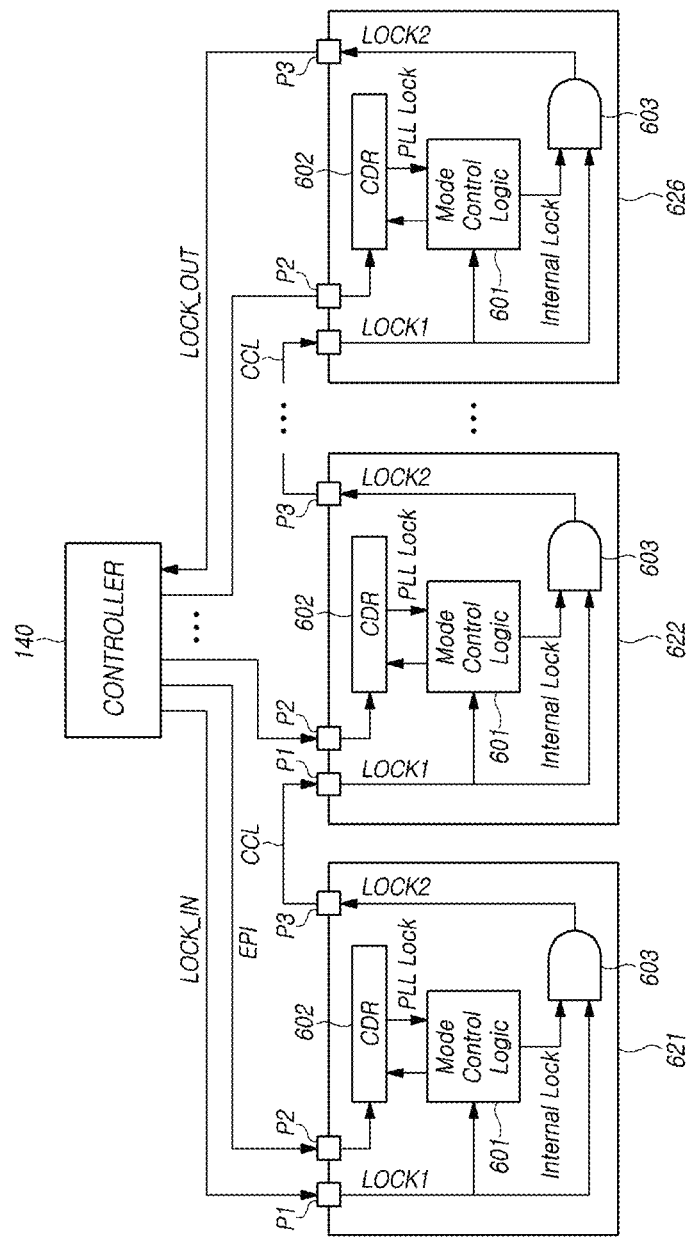
FIG. 6 illustrates a connection relationship between the controller shown in FIG. 4 and a connected locking circuit included in a plurality of source driver circuits according to one embodiment.

FIG. 6 illustrates a connection relationship between the controller shown in FIG. 4 and a connected locking circuit included in a plurality of source driver circuits according to one embodiment.

Referring to FIG. 6, the plurality of source driver circuits 120b may include locking circuits 621, 622, to 626, respectively. Here, the number of the plurality of locking circuits 621, 622, to 626 may correspond to the number of source driver circuits 120b.

Each of the plurality of locking circuits 621, 622, to 626 may include a first terminal P1, a second terminal P2, and a third terminal P3. A first lock signal LOCK1 may be supplied to the first terminal P1. The phase loop fixed data CFG may be supplied to the second terminal P2 in the first optimization mode IPS, and the error detection data BERT may be supplied in the second optimization mode AEQ. In addition, the clock training pattern CTP, the control data CTRS, and the image signal RGB, transmitted in the display mode DISPLAY, may be transmitted to the second terminal P2.

Among the plurality of locking circuits 621, 622, to 626, the first locking circuit 621 that at first receives the first lock signal LOCK1 is disposed in the first source driver circuit 121b shown in FIG. 3. The sixth locking circuit 626 that last receives the first lock signal LOCK1 may be disposed in the sixth source driver circuit 126b.

The lock-in line LOCK IN may be connected to the first terminal P1 of the first locking circuit 621 so that the first locking circuit 621 may be connected to the controller 140. In addition, the third terminal P3 of the sixth locking circuit 626 may be connected to the lock-out line LOCK OUT so that the sixth locking circuit 626 may be connected to the controller 140. The controller 140 may check the states of the plurality of source driver circuits 120b through the second lock signal LOCK2 transmitted through the lock-out line LOCK OUT.

In addition, the third terminal P3 of the first locking circuit 621 may be connected to the first terminal P1 of the adjacent second locking circuit 622. The third terminal P3 of the second locking circuit 622 is connected to the first terminal P1 of the third locking circuit 623, and the third terminal P3 of the third locking circuit 623 is a fourth terminal. The first terminal P1 of the locking circuit 624 may be connected, and the third terminal P3 of the fourth locking circuit 624 may be connected to the first terminal P1 of the fifth locking circuit 625. In addition, the third terminal P3 of the fifth locking circuit 625 may be connected to the first terminal P1 of the sixth locking circuit 626. Here, a line connecting the third terminal P3 and the first terminal P1 of the adjacent locking circuit 622 to 626 in each of the locking circuits 621 to 625 may be referred to as a cascade line CCL.

In addition, each of the locking circuits 621 to 626 may include a mode control logic circuit 601, a clock and data recovery circuit 602, and a logic gate circuit 603. Here, the logic gate circuit 603 is shown to be an AND gate, but is not limited thereto.

The mode control logic circuit 601 may distinguish a mode by receiving the first lock signal LOCK1 transmitted from the first terminal P1. That is, the mode control logic circuit 601 may distinguish between the first optimization mode IPS, the second optimization mode AEQ, and the display mode DISPLAY using the first lock signal LOCK1. The mode control logic circuit 601 determines the mode as the first optimization mode IPS when the first lock signal LOCK1 is a plurality of pulse waveforms having a preset pattern, as the second optimization mode AEQ when the first lock signal LOCK1 is in a low state, and as the display mode DISPLAY when the first lock signal LOCK1 is in a high state.

Further, the mode control logic circuit 601 may supply an internal clock signal to the logic gate circuit 603.

The clock and data recovery circuit 602 may operate in response to the control of the mode control logic circuit 601. The clock and data recovery circuit 602 may receive the phase loop fixed data CFG delivered to the second terminal P2. When the mode control logic circuit 601 recognizes that it is the first optimization mode IPS, the clock and data recovery circuit 602 receives the phase loop fixed data CFG and is set by the received phase loop fixed data CFG.

The clock and data recovery circuit 602 may output a phase loop lock state signal PLL LOCK that checks whether the clock phase and the frequency of the clock are fixed in the clock and data recovery circuit 602. When the phase and the frequency of the clock are fixed in the display mode DISPLAY, the phase loop lock state signal PLL LOCK may be output in a high state. On the other hand, when an error occurs in data transmitted from the controller 140 to the source driver circuit 120b, the phase loop lock state signal PLL LOCK may be output in a low state.

The logic gate circuit 603 may generate a second lock signal LOCK2 by calculating the first lock signal LOCK1 and the internal clock, and output the second lock signal LOCK2 through the third terminal P3.

In the first optimization mode IPS, the mode control logic circuit 601 may supply the internal clock signal in a high state to the logic gate circuit 603. When the internal clock signal in a high state is supplied to the logic gate circuit 603, since the logic gate circuit 603 performs an AND operation, the logic gate circuit 603 output the same second lock signal LOCK2 as the first lock signal LOCK1. In the first optimization mode IPS, since the first lock signal LOCK1 of a plurality of pulse waveforms having a preset pattern, the second lock signal LOCK2 also has a plurality of pulse waveforms having the same pattern as the first lock signal LOCK1. That is, in the first optimization mode IPS, the first locking signal LOCK1 may be bypassed and output as the second locking signal LOCK2.

In addition, in the second optimization mode AEQ, the mode control logic circuit 601 may output the internal clock signal in a low state. In the second optimization mode AEQ, the first lock signal LOCK1 is transmitted in a low state, and the logic gate circuit 603 may output the second lock signal LOCK2 in the low state.

In the display mode DISPLAY, the clock and data recovery circuit 602 may fix the phase and the frequency of the clock using the clock training pattern CTP and the set phase loop fixed data CFG. The clock and data recovery circuit 602 may recover the clock according to the phase and the frequency of the fixed clock.

In addition, the mode control logic circuit 601 may output the internal clock signal in the same state as the phase loop lock state signal PLL LOCK in the display mode DISPLAY. When the phase and the frequency of the clock are fixed in the display mode DISPLAY, the phase loop lock state signal PLL LOCK may be output in a high state. In addition, the internal clock signal may be output in a high state, which is a state of the phase loop lock state signal PLL LOCK, so that the second lock signal LOCK2 may be output in the same state as the first lock signal LOCK1. Accordingly, in the display mode DISPLAY, the second lock signal LOCK2 may be output in a high state. The controller 140 may recognize that the phase and the frequency of the clocks output from the plurality of source driver circuits 120b are fixed in the high state by the first lock signal LOCK1.

When the phase loop lock state signal PLL LOCK is output in a low state, the internal clock signal is output in a low state, which is the state of the phase loop lock state signal PLL LOCK, and the second lock signal LOCK2 is output in a low state. Due to the second lock signal LOCK2 in the low state, the controller 140 may recognize that the phase and the frequency of the clock output from the plurality of source driver circuits 120b are released from the fixed state. When the second lock signal LOCK2 is output in a low state, the controller 140 may cause the first period Phase 1 to be performed again.

FIG. 7 is a timing diagram illustrating that the controller and the source driver circuit shown in FIG. 6 operate in a first optimization mode according to one embodiment.

Referring to FIG. 7, the first optimization mode IPS may be divided into a first period T11, a second period T12, and a third period T13. The data may be transmitted to the data transmission line EPI in the first optimization mode IPS. The transmitted data in FIG. 7 differently represents a pulse waveform transmitted through the data transmission line EPI and that transmitted by a differential signal.

The first lock signal LOCK1 or the second lock signal LOCK2 may be transmitted through the lock-in line LOCK IN or the lock-out line LOCK OUT. Also, the first lock signal LOCK1 may be transmitted between the source driver circuits 120b through the cascade line CCL. Since the second lock signal LOCK2 is generated after the first lock signal LOCK1 passes through the plurality of source driver circuits 120b, the second lock signal LOCK2 may be generated later than the first lock signal LOCK1.

In the first period T11, data transmitted to the data transmission line EPI may be zero. In order for the transmitted data to become 0, the rising edge of the first lock signal LOCK1 may correspond to a time point in which the clock transmitted to the data transmission line EPI is in a low state. In addition, a plurality of pulse waves having a preset pattern may be transmitted during the second period T12. According to a preset pattern, the first rising edge of the first lock signal LOCK1 corresponds to the high state of the clock and the second rising edge corresponds to the low state of the clock. Therefore, it can be seen that the transmitted data is 1010. However, this is illustrative and is not limited thereto.

After the pulse wave having the preset pattern is transmitted through the data transmission line EPI, the phase loop fixed data CFG1 to CFG40 may start to be transmitted. After the plurality of pulse waves of the preset pattern having 1010 data are input, a third period T13 may be started. The phase loop fixed data CFG1 to CFG40 may be transferred to the source driver circuit 120b. The phase loop fixed data CFG may be stored in the controller 140. Here, the number of phase loop fixed data CFG1 to CFG40 is shown to be 40, but is not limited thereto.

In addition, it may further include the fourth period T14 through which the signal transmitted to the transmission line EPI is in a low state and the first lock signal LOCK1 and the second lock signal (LOCK2) maintain a state having the plurality of pulses. As the first lock signal LOCK1 further maintains the state having the plurality of pulses in the fourth period T14, the source driver circuit 120b further may maintain an operation corresponding to the first lock signal LOCK1 for a preset period of time.

The phase loop fixed data CFG may be input to the clock and data recovery circuit 602 in response to the first lock signal LOCK1. That is, the clock and data recovery circuit 602 may store the phase loop fixed data CFG input to the clock and data recovery circuit 602.

Also, the phase loop fixed data CFG may be converted and output. If the phase loop locked data CFG is transmitted as 0000 or 1111, since the phase loop locked data CFG includes unchanged data, it can be converted to include 0s and 1s by bit extension. In addition, since the phase loop fixed data CFG is supplied as a differential signal, for example, 0 can be converted to 0111 and 1 can be converted to 0001. For this reason, the number of 1s and 0s of the converted number can be made the same.

Figures 8A, 8B:
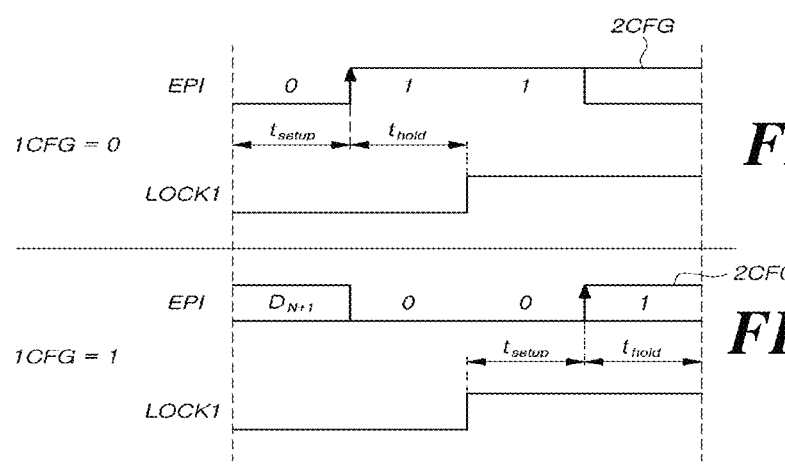
FIGS. 8A and 8B are timing diagrams illustrating a process of converting phase loop fixed data in the first optimization mode shown in FIG. 7 according to one embodiment.

FIGS. 8A and 8B are timing diagrams illustrating a process of converting phase loop fixed data in the first optimization mode shown in FIG. 7 according to one embodiment.

FIG. 8A shows a case where the basic phase loop fixed data 1CFG is 0, and FIG. 8B shows a case where the basic phase loop fixed data 1CFG is 1.

Referring to FIG. 8, the phase loop fixed data 2CFG is data in which the number of bits of the basic phase loop fixed data 1CFG including N bits (N is a natural number of 1 or more) is extended and each of the N bits included in the basic phase loop fixed data 1CFG is extended to 2 bits or more including at least one 0 and at least one 1. The phase loop fixed data 2CFG may be converted by bit extension of the basic phase loop fixed data 1CFG by the controller 140.

The basic phase loop fixed data 1CFG may be stored in the controller 140, and the phase loop fixed data 2CFG is transmitted from the controller 140 to the plurality of source driver circuits 120b, respectively. In addition, the phase loop fixed data 2CFG may be the bit extension such that one bit included in the basic phase loop fixed data 1CFG includes at least one 0 and at least one 1. In addition, since the basic phase loop fixed data 1CFG is a differential signal transmitted through each of the two lines, the phase loop fixed data 2CFG is that the number of 1s and 0s included in the extended bits may be the same.

The setup time t setup and the hold time t hold are times required for the source driver circuit 120b to recognize data transferred from the controller 140 to the source driver circuit 120b. That is, the source driver circuit 120b can recognize the data only when the data setup during the setup time t setup is maintained during the hold time t hold. A sum of the setup time t setup and the hold time t hold may correspond to a time at which one bit of data is transmitted.

As shown in FIG. 8A, when the basic phase loop fixed data 1CFG is 0, the controller 140 may convert the basic phase loop fixed data 1CFG to 0110, generate the phase loop fixed data 2CFG and transmit it to the source driver circuit 120b. The source driver circuit 120b may check the basic phase loop fixed data 1CFG using the phase loop fixed data 2CFG converted to 0110 and the first lock signal LOCK1.

Since the first lock signal LOCK1 is transmitted in the form of a plurality of pulse waves in the first optimization mode IPS, it repeats a high state and a low state. The first lock signal LOCK1 may maintain a high state or a low state during a time period through which two bits of the phase loop fixed data 2CFG are transmitted.

In addition, when the phase loop fixed data 2CFG is at the rising edge, the state of the first lock signal LOCK1 may be recognized as the basic phase loop fixed data 1CFG. That is, when the base phase loop fixed data 2CFG is at the rising edge, the first lock signal LOCK1 is in a low state, so the source driver circuit 120b may recognize that the base phase loop fixed data 1CFG is 0.

As shown in FIG. 8B, when the basic phase loop fixed data 1CFG is 1, the controller 140 may convert the basic phase loop fixed data 1CFG to 1001, generate the phase loop locked data 2CFG and transmit it to the source driver circuit 120b. The source driver circuit 120b may check the basic phase loop fixed data 1CFG using the phase loop fixed data 2CFG converted to 1001 and the first lock signal LOCK1.

Since the first lock signal LOCK1 is transmitted in the form of a plurality of pulse waves in the first optimization mode IPS, it repeats the high state and the low state. The first lock signal LOCK1 may maintain a high state or a low state during a time period through which two bits of the phase loop fixed data 2CFG are transmitted.

In addition, when the phase loop fixed data 2CFG is at a rising edge, the state of the first lock signal LOCK1 may be recognized as the phase loop fixed data 1CFG. That is, since the first lock signal LOCK1 is in a high state when the phase loop fixed data 2CFG is at the rising edge, the source driver circuit 120b may recognize that the basic phase loop fixed data 1CFG is 1.

Figures 9A, 9B:
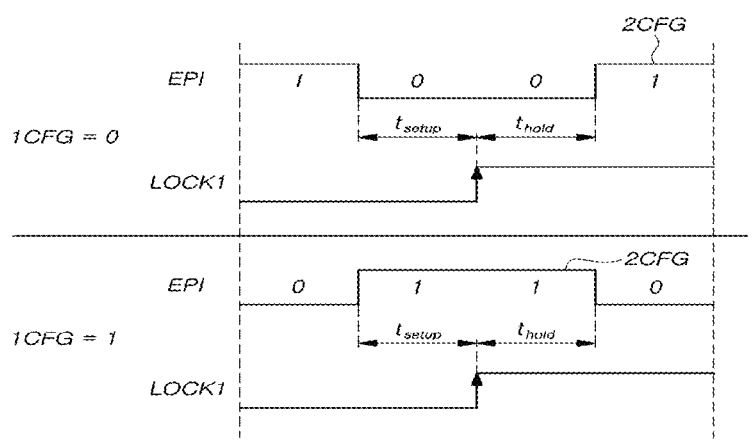

FIGS. 9A and 9B are timing diagrams illustrating a process of converting phase loop fixed data in the first optimization mode shown in FIG. 7 according to another embodiment.

FIG. 9A shows a case where the basic phase loop fixed data 1CFG is 0, and FIG. 9B shows a case where the basic phase loop fixed data 1CFG is 1.

Referring to FIG. 9, the phase loop fixed data 2CFG is data in which the number of bits of the basic phase loop fixed data 1CFG including N bits (N is a natural number of 1 or more) is extended and each of the N bits included in the basic phase loop fixed data 1CFG is extended to 2 bits or more including at least one 0 and at least one 1. The phase loop fixed data 2CFG may be converted by bit extension of the basic phase loop fixed data 1CFG by the controller 140.

The basic phase loop fixed data 1CFG may be stored in the controller 140, and the phase loop fixed data 2CFG is transmitted from the controller 140 to the plurality of source driver circuits 120b, respectively. In addition, the phase loop fixed data 2CFG may be the bit extension such that one bit included in the basic phase loop fixed data 1CFG includes at least one 0 and at least one 1. In addition, since the basic phase loop fixed data 1CFG is a differential signal transmitted through each of the two lines, the phase loop fixed data 2CFG is that the number of 1s and 0s included in the extended bits may be the same.

The setup time t setup and the hold time t hold are times required for the source driver circuit 120b to recognize data transferred from the controller 140 to the source driver circuit 120b. That is, the source driver circuit 120b can recognize the data only when the data held during the setup time t setup is maintained during the hold time t hold. A sum of the setup time t setup and the hold time t hold may correspond to a time at which one bit of data is transmitted.

As shown in FIG. 9A, when the basic phase loop fixed data 1CFG is 0, the controller 140 may convert the basic phase loop fixed data 1CFG to 1001, generate the phase loop fixed data 2CFG and transmit it to the source driver circuit 120b. The source driver circuit 120b may check the basic phase loop fixed data 1CFG using the phase loop fixed data 2CFG converted to 1001 and the first lock signal LOCK1.

Since the first lock signal LOCK1 is transmitted in the form of a plurality of pulse waves in the first optimization mode IPS, it repeats a high state and a low state. The first lock signal LOCK1 may maintain a high state or a low state during a time period through which two bits of the phase loop fixed data 2CFG are transmitted.

In addition, when the phase loop fixed data 2CFG is at the rising edge, the state of the first lock signal LOCK1 may be recognized as the basic phase loop fixed data 1CFG. That is, when the base phase loop fixed data 2CFG is at the rising edge, the first lock signal LOCK1 is in a low state, so the source driver circuit 120b may recognize that the base phase loop fixed data 1CFG is 0.

As shown in FIG. 9B, when the basic phase loop fixed data 1CFG is 1, the controller 140 may convert the basic phase loop fixed data 1CFG to 0110, generate the phase loop locked data 2CFG and transmit it to the source driver circuit 120b. The source driver circuit 120b may check the basic phase loop fixed data 1CFG using the phase loop fixed data 2CFG converted to 0110 and the first lock signal LOCK1.

Since the first lock signal LOCK1 is transmitted in the form of a plurality of pulse waves in the first optimization mode IPS, it repeats the high state and the low state. The first lock signal LOCK1 may maintain a high state or a low state during a time period through which two bits of the phase loop fixed data 2CFG are transmitted.

In addition, when the phase loop fixed data 2CFG is at a rising edge, the state of the first lock signal LOCK1 may be recognized as the phase loop fixed data 1CFG. That is, since the first lock signal LOCK1 is in a high state when the phase loop fixed data 2CFG is at the rising edge, the source driver circuit 120b may recognize that the basic phase loop fixed data 1CFG is 1.

FIGS. 10A and 10B and 11A and 11B are timing diagrams illustrating a process in which a first lock signal and phase loop fixed data are transmitted to a plurality of source driver circuits in an embodiment.

Figure 10A:
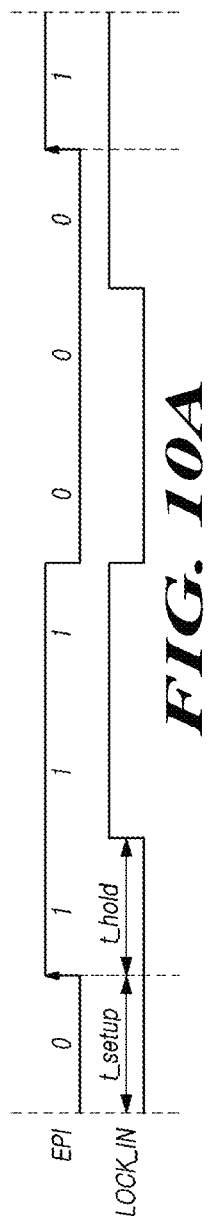
Figure 10B:
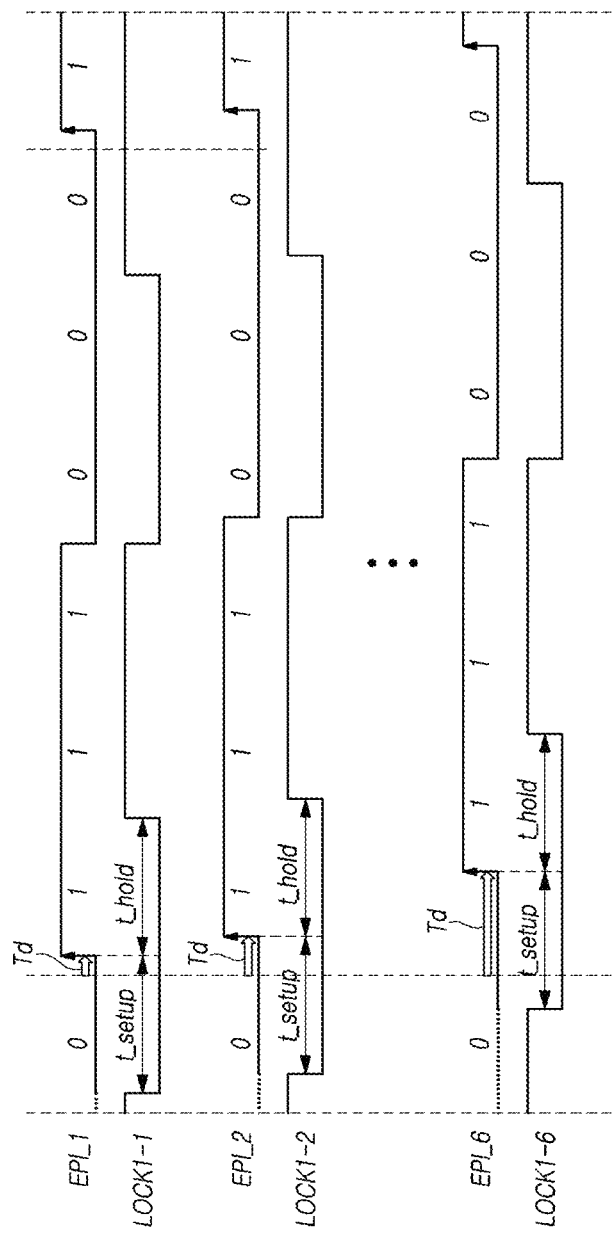

FIGS. 10A and 11A show a phase loop fixed data CFG transmitted from the controller 140 through the data transmission line EPI and the first lock signal LOCK1 transmitted from it through the lock-in line LOCK IN. Further, FIGS. 10B and 11B show the phase loop fixed data CFG and the first lock signals LOCK1_1 to LOCK1_6 received from each source driver circuit 120b, respectively. The phase loop fixed data CFG may include the bits extended by the controller 140.

Since the first lock signal LOCK1 is transmitted in a cascade manner to each source driver circuit 120b, the signal received from each source driver circuit 120b is transmitted according to the position of the source driver circuit 120b. The phase loop fixed data CFG and the first lock signals LOCK1_1 to LOCK1_6 may be transmitted at different times for each source driver circuit 120b. On the other hand, since the phase loop fixed data CFG is transmitted to each source driver circuit 120b in parallel, it may be simultaneously transmitted to each source driver circuit 120b.

When the first lock signals LOCK1_1 to LOCK1_6 are transmitted to each of the source driver circuits 120b at different times, the setup time t setup may be insufficient. As a result, the source driver circuit 120b cannot recognize the transmitted data. In particular, when a high-frequency signal is used, such a problem may become larger.

In order to solve the above problem, the controller 140 may delay the phase loop fixed data CFG and transmit it to each source driver circuit 120b. The delay time Td at which the phase loop fixed data CFG is delayed may be set differently for each source driver circuit 120b.

To this end, the controller 140 may store a delay time Td corresponding to each source driver circuit 120b, and supply the phase Loop fixed data CFG depending on the delay time Td stored in each source driver circuit 120b. Accordingly, depending on the set delay time Td, the setup time is constant in each source driver circuit 120b, so that the controller 140 and the source driver circuit 120b can operate stably.

As shown in FIG. 10B, the source driver circuits 120b may check the supplied phase loop fixed data CFG according to the state of the first lock signals LOCK1-1 to LOCK1-6 in response to the rising edge of the phase loop fixed data CFG. As shown in FIG. 11B, the source driver circuit 120b may check the supplied phase loop fixed data CFG in response to the rising edges of the first lock signals LOCK1-1 to LOCK1-6.

FIGS. 12A and 12B are timing diagrams showing an embodiment of the blank period shown in FIG. 4.

As shown in FIG. 4, in the display mode DISPLAY, after the phase and the frequency of the signal output by the clock training pattern CTP are fixed in the first period Phase 1, the third period Phase 3 and the fourth period Phase 4 are performed, so that the image may be displayed on the display panel 110. Further, the third period Phase 3 and the fourth period Phase 4 may be performed after the blank period BLT is performed instead of the first period Phase 1 again. That is, after turning on, in the display mode DISPLAY, the first period Phase 1 is performed once, and the third period Phase 3 and the fourth period Phase 4 are repeated so that the image may be displayed on the display panel 110.

The second period Phase 2, which is a blank period, appears before the image is displayed or between the image is displayed. FIG. 12A shows the blank period ILT between the third period Phase 3 and the fourth period Phase 4 in FIG. 4, and FIG. 12B shows the blank period ILT after the third period Phase 3 and the fourth period Phase 4 are performed and before the third period Phase 3 and the fourth period Phase 4 are again performed. Both FIG. 12A and FIG. 12B may be shown a second period Phase 2 in FIG. 4.

As shown in FIG. 12A, in the blank period ILT, the controller 140 may supply blank data HB having a specific pattern. In addition, the controller 140 may count the number of packets of the blank data HB so that the third period Phase 3 starts when the number of packets of the blank data HB reaches a preset value. However, when the blank data HB is transmitted through the data transmission line EPI, it may be transmitted with a preset pulse waveform.

When the blank data HB are repeated, signals having the same pulse waveform are repeated through the data transmission line EPI, thereby deteriorating the EMI (Electro Magnetic Interference) of the display device 100. However, in the display mode DISPLAY, the blank period ILT occurs once and is not repeated again. Accordingly, even if the blank data (HB) are repeated within the blank period ILT, the EMI of the display device 100 may not become bad.

On the other hand, the blank periods BLT may be repeated in the display mode DISPLAY. When the blank periods BLT are repeated, the EMI of the display device 100 may be deteriorated due to the repeated blank data HB.

To solve this problem, after random data DUM DATA whose pulse waveform is determined randomly is supplied in a part of the blank period BLT as shown in FIG. 12B, the blank data HB having the specific pattern may be supplied. That is, the blank period BLT may be divided into a first blank period through which the random data DUM DATA is transmitted and a second blank period through which the blank data HB having the preset pulse waveform is transmitted. The pulse waveform of the signal transmitted through the data transmission line EPI in the blank period BLT is not repeated due to random data DUM DATA, thereby preventing the EMI of the display device 100 from deteriorating.

In addition, the controller 140 may supply the random data DUM DATA after confirming that the fourth period Phase 4 has ended by counting the number of packets of data of the video signal RGB. The number of packets of blank data HB having the specific pattern must be equal to or greater than a preset number thereof. The controller 140 may include a counter which counts the number of packets of the blank data HB or the data of the image signal RGB.

Figure 13:
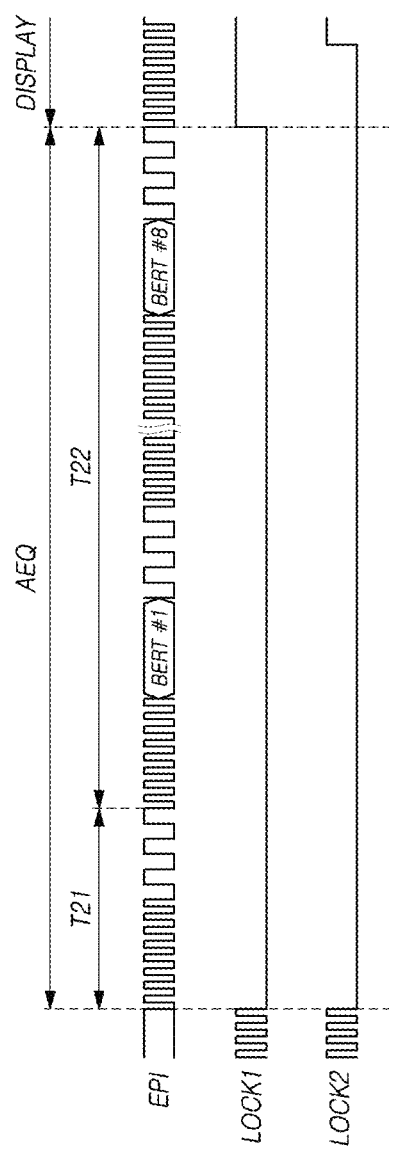
FIG. 13 is a timing diagram illustrating an embodiment of the second optimization mode shown in FIG. 4.

FIG. 13 is a timing diagram illustrating an embodiment of the second optimization mode shown in FIG. 4.

Referring to FIG. 13, the second optimization mode AEQ may be divided into a preparation period T21 and an error detection period T22 to operate. In the preparation period T21, the plurality of pulse waves having the preset pattern may be transmitted through the data transmission line EPI. It can be seen that the source driver circuit 120b has started the second optimization mode AEQ due to the plurality of pulse waves having the preset pattern transmitted through the data transmission line EPI in the preparation period T21. That is, it can be seen that the source driver circuit 120b has started the error detection period T22 due to the plurality of pulse waves having the preset pattern to be transmitted.

In the error detection period T22, the plurality of error detection data BERT may be transmitted. Here, although it is shown that the number of the plurality of error detection data BERT is eight, it is not limited thereto.

The plurality of source driver circuits 120b may sequentially receive the plurality of error detection data BERT. In addition, the controller 140 may receive a bit-by-bit error rate for each error detection data BERT from each of the plurality of source driver circuits 120b. The plurality of source driver circuits 120b may transmit the bit-by-bit error rate to the controller 140 through separate pins. In addition, the controller 140 may tune and transmit the voltage level of data transmitted through the data transmission line EPI according to the error detection data BERT having the lowest bit-by-bit error rate.

Figure 14:
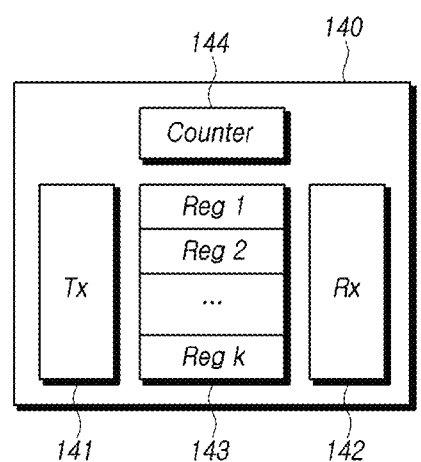
FIG. 14 is a structural diagram showing the structure of a controller according to one embodiment.

FIG. 14 is a structural diagram showing the structure of a controller according to one embodiment.

Referring to FIG. 14, the controller 140 may include a first transmission circuit 141, a first reception circuit 142, and a plurality of registers 143. Also, the controller 140 may include a counter 144.

The first transmission circuit 141 may supply the first lock signal LOCK1, the phase loop fixed data CFG, the video signal RGB, and the control data CTRS through the lock-in line (LOCK IN) and the data transmission line EPI different from each.

The first reception circuit 142 may be connected to the lock-out line LOCK OUT to receive the second lock signal LOCK2.

The plurality of registers 143 may store the plurality of phase loop fixed data CFG. In addition, the plurality of registers 143 may store the plurality of tuned data. The plurality of phase loop fixing data CFG and the plurality of tuned data stored in the plurality of registers 143 may be transmitted to the plurality of source driver circuits 120 through the first transmission circuit 141. In addition, a delay time set for each source driver circuit 120b may be stored in the plurality of registers 143.

In addition, the controller 140 may count the number of transmitted data or the number of packets of received data using the counter 144.

Figure 15:
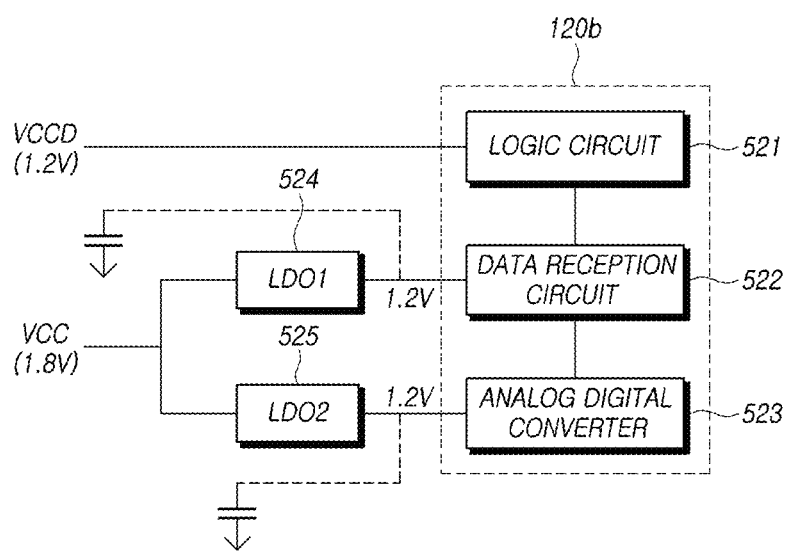
FIG. 15 is a block diagram illustrating improving noise of a source driver circuit in a display device according to one embodiment.

FIG. 15 is a block diagram illustrating improving noise of a source driver circuit in a display device according to one embodiment.

Referring to FIG. 15, the source driver circuit 120b may include a logic circuit 521, a data reception circuit 522, and an analog digital converter 523.

The logic circuit 521 may operate by receiving the second driving voltage VCCD. The voltage level of the second driving voltage VCCD may be a specific voltage such as 1.2V. However, it is not limited thereto. The logic circuit 521 may perform a logic operation in the source driver circuit 120b. The logic circuit 521 may include a shift register.

The data reception circuit 522 may cause the source driver circuit 120b to receive data. The received data may include an image signal RGB and control data CTRS. The data reception circuit 522 may include a latch. The latch may receive the image signal RGB in series under the control of the logic circuit 521 including the shift register. In addition, the latch may output the stored image signal RGB in parallel.

The analog digital converter 523 may convert an analog signal transmitted to the source driver circuit 120b into a digital signal. The analog digital converter 523 may be an analog digital converter 220 connected to the pixel shown in FIG. 2.

The data reception circuit 522 and the analog digital converter 523 of the source driver circuit 120b as described above may operate by receiving the first driving power VCC. The voltage level of the first driving power VCC may be a specific voltage such as 1.8V. However, it is not limited thereto.

The first voltage regulator 524 and the second voltage regulator 525 may be connected to the data reception circuit 522 and the analog digital converter 523, respectively. For this reason, since the power supplied to the data reception circuit 522 and the analog digital converter 523 are distinguished, noise is suppressed by one power source, thereby reducing data transmission errors.

Since the first voltage regulator 524 and the second voltage regulator 525 are connected to the data reception circuit 522 and the analog digital converter 523, the voltage level of the first driving power supply VCC may be low to the data reception circuit 522 and the analog digital converter 523. That is, the voltage level of the power VCC supplied from the first driving power supply is lowered by the first voltage regulator 524 and the second voltage regulator 525, and then may be supplied to the data reception circuit 522 and the analog digital converter 523. In this case, the voltage level of the second driving power supply VCCD supplied to the logic circuit 521 may be the same as the voltage level of the voltage output from the first voltage regulator 524 and the second voltage regulator 525.

Figure 16:
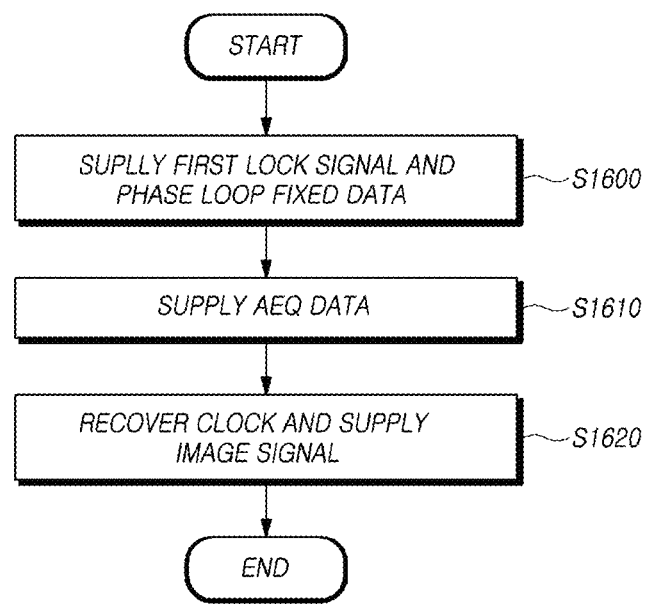
FIG. 16 is a flowchart illustrating a method of driving a display device according to one embodiment.

FIG. 16 is a flowchart illustrating a method of driving a display device according to one embodiment.

Referring to FIGS. 3 and 16, when power is supplied to the display device 100, the first lock signal LOCK1 of a plurality of pulse waveforms having a preset pattern may be supplied to the plurality of source driver circuits 120b. In addition, a plurality of phase loop fixed data CFGs may be supplied in parallel to the plurality of source driver circuits 120b at step of S1600. The plurality of source driver circuits 120b may receive a first lock signal LOCK1 and a plurality of phase loop fixed data CFGs from the controller 140.

As mentioned above, a period in which the first lock signal LOCK1 and the plurality of phase loop fixed data CFGs are supplied to the plurality of source driver circuits 120b may be referred to as the first optimization mode IPS. The source driver circuit 121b shown in FIG. 3 connected by a lock-in line LOCK IN among the plurality of source driver circuits 120b receives the first lock signal LOCK1 shown in FIG. 4 from the controller 140. The first lock signal LOCK1 may be transmitted between the plurality of source driver circuits 120b in a cascade manner.

In addition, as shown in FIG. 3, the controller 140 transmits the phase loop fixed data CFG shown in FIG. 4 to a plurality of source driver circuits 120b through a data transmission line EPI in parallel. The controller 140 may supply the phase loop fixed data CFG to the plurality of source driver circuits 120b through bit extension by increasing the number of bits.

For example, the second phase loop fixed data 2CFG is data in which the number of bits of the basic phase loop fixed data 1CFG including N (N is a natural number of 1 or more) is extended, and each of the N bits included in the basic phase loop fixed data 1CFG is extended to 2 bits or more including at least one 0 and at least one 1. The second phase loop fixed data 2CFG may be supplied as a differential signal. In addition, when the bit is extended, the number of 1s and 0s included in the extended bits of the second phase loop fixed data 2CFG may be the same.

At this time, the first lock signal LOCK1 may be transmitted by sequentially bypassing the plurality of source driver circuits 120b and then supplied back to the timing control path 140. The first lock signal LOCK1 may be a signal input to the source driver circuit 121b. In addition, a signal output from the source driver circuit 126b receiving the first lock signal LOCK1 may be referred to as a second lock signal LOCK2.

When the plurality of phase loop fixed data CFGs are supplied, the frequency and the phase of the clock recovered by the plurality of phase loop fixed data CFGs may be set in each of the plurality of source driver circuits 120b at step of S1600.

The second optimization mode AEQ may be performed. In the second optimization mode AEQ, data corresponding to the second optimization mode AEQ may be supplied. The second optimization mode AEQ may be performed when the first lock signal LOCK1 having a preset voltage level is supplied to the plurality of source driver circuits 120b. In the second optimization mode AEQ, a plurality of error detection data BERT may be supplied to the plurality of source driver circuits 120b.

When the first lock signal LOCK1 is supplied as a plurality of pulse waveforms having the preset pattern in the first optimization mode IPS, the preset voltage level of the first lock signal LOCK1 in the second optimization mode AEQ may be the voltage level in the low state of the first lock signal LOCK1. The controller 140 may transmit the error detection data BERT to the plurality of source driver circuits 120b in parallel. The controller 140 may lower a transmission error rate of the image signal RGB by one of a plurality of error detection data.

Then, a display mode DISPLAY may be performed. In the display mode DISPLAY, internal clocks of the plurality of source driver circuits 120b may be recovered, and an image signal RGB may be supplied to each of the plurality of source driver circuits 120b at step of S1620.

The display mode DISPLAY may be performed when the first lock signal LOCK1 reaches the set first voltage. The first lock in the second optimization mode AEQ in order to distinguish the voltage level of the first lock signal LOCK1 in the second optimization mode AEQ from the voltage level of the first lock signal LOCK1 in the display mode DISPLAY. The voltage level of the signal LOCK1 may be referred to as a second voltage.

When the first lock signal LOCK1 is supplied as a plurality of pulse waveforms having the set pattern in the first optimization mode IPS, the voltage level of the first voltage of the first lock signal LOCK1 in the display mode DISPLAY may be a voltage level in the high state of the first lock signal LOCK1. When the first lock signal LOCK1 reaches the set first voltage, the display mode DISPLAY is performed, and the internal clock of each of the plurality of source driver circuits 120b may be recovered as a frequency and phase corresponding to the phase loop fixed data CFG in the first optimization mode IPS. Also, the control data CTRS and the image signal RGB may be transmitted to the plurality of source driver circuits 120b. At this time, the voltage level of the data transmitted from the controller 140 to the plurality of source driver circuits 120b can be adjusted in response to the error detection data BERT set in the second optimization mode AEQ and the control data CTRS with improved EYE characteristics and the image signal RGB may be transmitted to the plurality of source driver circuits 120b.

The display mode DISPLAY includes the first display period Phase 1 supplying the clock training pattern CTP to the plurality of source driver circuits 120b, the second display period Phase 2 including the blank period through which the signal and the image signal RGB are not transmitted, the third display period Phase 3 through which the control data CTRS is transmitted, and a fourth display period Phase 4 through which the image signal RGB are transmitted.

In addition, the driving frequency of the display device 100 may increase after a certain period of time after the power is supplied. The display device 100 may be driven at a low frequency in the first optimization mode IPS, and may be driven at a higher frequency in the second optimization mode AEQ and the display mode DISPLAY than that in the first optimization mode IPS.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
   a controller that operates in a first optimization mode and operates in a display mode after the first optimization mode; and
   a plurality of source driver circuits connected to the controller, the plurality of source driver circuits controlled by the controller,
   wherein in the first optimization mode, the controller transmits a first lock signal having a plurality of pulse waveforms to a first source driver circuit among the plurality of source driver circuits, receives a second lock signal having a plurality of pulse waveforms from a last source driver circuit that receives the first lock signal which is transmitted from the first source driver circuit to the last source driver circuit in a cascade manner, and transmits a plurality of phase loop fixed data for recovering a frequency and a phase of a clock used in operation of each of the plurality of source driver circuits to each of the plurality of source driver circuits when the second lock signal is received, in the display mode, the controller transmits a first lock signal having a preset voltage level to the first source driver circuit, receives a second lock signal having a plurality of the preset voltage level from a last source driver circuit receiving the first lock signal which is transmitted from the first source driver circuit to the last source driver circuit in the cascade manner, and supplies an image signal and control data to each of the plurality of source driver circuits when the second lock signal is received.

2. The display device according to claim 1, wherein the phase and the frequency of the clock used in each of the plurality of source driver circuits is fixed and respectively corresponding to each of the plurality of phase loop fixed data.

3. The display device according to claim 1, wherein the controller transmits the plurality of phase loop fixed data to the plurality of source driver circuits with a time difference based on a preset delay time in each of the plurality of source driver circuits.

4. The display device according to claim 1, wherein the plurality of phase loop fixed data is data in which a number of bits of a basic phase loop fixed data including N bits (N is a natural number of 1 or more) is extended and each of the N bits included in the basic phase loop fixed data is extended to 2 bits or more including at least one 0 and at least one 1.

5. The display device according to claim 4, wherein each of the plurality of phase loop fixed data is a differential signal, and in each of the plurality of phase loop fixed data, a number of bits representing 1 and a number of bits representing 0 are a same.

6. The display device according to claim 4, wherein in the first optimization mode, each of the plurality of source driver circuits recognizes the basic loop fixing data as 0 when the phase loop fixing data is 0 at a rising edge of the first lock signal, and the basic phase loop fixing data as 1 when the phase loop fixing data is 1 at the rising edge of the first lock signal, or each of the plurality of source driver circuits recognizes the basic phase loop fixed data as 1 when a state of the first lock signal is high at the rising edge of the phase loop fixed data, and the basic phase loop fixed data as 0 when the state of the first lock signal is low at the rising edge of the phase loop fixed data.

7. The display device according to claim 1, wherein the display mode comprises:

a first display period in which the controller supplies clock training patterns to the plurality of source driver circuits;

a second display period in which signals for controlling the plurality of source driver circuits are not transmitted to the plurality of source driver circuits;

a third display period in which the controller transmits the control data to the plurality of source driver circuits; and a fourth display period in which the controller outputs the image signal to the plurality of source driver circuits.

8. The display device according to claim 7, wherein the second display period includes a first blank period in which random data having a random pulse waveform is transmitted and a second blank period in which blank data having a preset pulse waveform is transmitted.

9. The display device according to claim 8, wherein the controller counts a number of packets of the blank data transmitted during the second blank period to recognize an end of the second display period.

10. The display device according to claim 1, wherein a second optimization mode is further performed between the first optimization mode and the display mode, and in the second optimization mode, the controller transmits a plurality of error detection data to each of the plurality of source driver circuits, and checks a transmission error rate of data in correspondence with an error detection data when each of the plurality of source driver circuits receives the transmission error detection data from the controller.

11. The display device according to claim 10, wherein the first lock signal has a preset voltage level in the second optimization mode, but has a voltage level different from that of the first lock signal in the display mode.

12. The display device according to claim 10, wherein each of the plurality of source driver circuits includes a locking circuit, and wherein the locking circuit comprises:

a mode control logic circuit receiving the first lock signal to distinguish one of the first optimization mode, the second optimization mode, and the display mode, and outputting an internal clock signal corresponding one of the first optimization mode, the second optimization mode, and the display mode;

a clock and data recovery circuit recovering the clock, and transferring a fixed phase and frequency to the mode control logic circuit; and a logic gate circuit calculating and outputting the received internal clock signal and the first lock signal from the mode control logic circuit.

13. The display device according to claim 1, wherein the controller includes a plurality of registers configured to store basic phase loop fixed data required to generate the plurality of phase loop fixed data.

14. The display device according to claim 1, further comprising:

a lock-in line connecting the controller and a first source driver circuit among the plurality of source driver circuits;

a lock-out line connecting the controller and the last source driver circuit among the plurality of source driver circuits; and a cascade line connecting the plurality of source driver circuits, and wherein the first lock signal is transferred from the controller to the first source driver circuit through the lock-in line, the first lock signal transferred to the first source driver circuit is transferred from the first source driver circuit to the last source driver circuit in a cascaded manner through the cascade line, and the second lock signal is transferred from the last source driver circuit to the controller through the lock-out line.

15. The display device according to claim 1, further comprising a data transmission line connecting the controller and each of the plurality of source driver circuits, wherein the phase loop fixed data, the image signal, and the control data are transmitted from the controller to each of the plurality of source driver circuits through the data transmission line.

16. The display device according to claim 1, wherein each of the plurality of source driver circuits comprises a logic circuit, a data reception circuit, and an analog digital converter.

17. The display device according to claim 16, wherein each of the plurality of source driver circuits further comprises a first voltage regulator connected to the data reception circuit and a second voltage regulator connected to the analog digital converter.

18. A driving method comprising:
supplying a first lock signal of a plurality of pulse waveforms having a preset pattern and a plurality of phase loop fixed data from a controller to a plurality of source driver circuits; and
setting, in each of the plurality of source driver circuits, a frequency and a phase of a clock recovered by the plurality of phase loop fixed data; and
recovering the clock in response to the plurality of phase loop fixed data and transmitting an image signal to each of the plurality of source driver circuits when the first lock signal having a preset first voltage is supplied to the plurality of source driver circuits.

19. The driving method according to claim 18, wherein a delay time is set in each of the plurality of source driver circuits, and the phase loop fixed data is supplied to each of the plurality of source driver circuits in response to the set delay time.

20. The driving method according to claim 18, further comprising:
supplying a plurality of error detection data to the plurality of source driver circuits when the first lock signal has a preset second voltage different from the first voltage and lowering a transmission error rate of the image signal with one of the error detection data by the controller.

* * * * *